United States Patent Office 3,068,240
Patented Dec. 11, 1962

3,068,240
REDUCTION OF VAT DYESTUFFS
Otto Fuchs, Fritz Meininger, and Gerhard Pfeiffer, Frankfurt am Main, Germany, assignors to Farbwerke Hoechst Aktiengesellschaft vormals Meister Lucius & Brüning, Frankfurt am Main, Germany, a corporation of Germany
No Drawing. Filed Apr. 27, 1959, Ser. No. 808,860
Claims priority, application Germany May 3, 1958
7 Claims. (Cl. 260—316)

In U.S. patent application Serial No. 761,287, filed September 16, 1958, in the name of Otto Fuchs et al., now U.S. Patent No. 3,007,046 is disclosed a process for the preparation of leuco sulfuric acid esters of vat dyestuffs by reacting the leuco compound of the vat dyestuff or a metal salt of the leuco compound or a complex compound of the leuco compound with sulfur trioxide or a compound yielding sulfur trioxide in the presence of an organic carboxylic acid amide corresponding to the following general formula

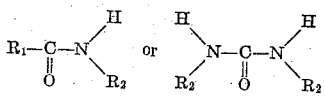

wherein $R_1$ represents an alkyl group and $R_2$ an alkyl or aryl group, if desired, in the presence of a diluent.

The leuco compounds of the vat dyestuffs can be prepared in this process with special advantage by reducing a finely dispersed vat dyestuff with a metal, such as zinc dust, iron or copper powder, and an anhydrous acid, such as glacial acetic acid, mono-, di-, or trichloroacetic acid, hydrochloric acid or propionic acid.

The reduction can be carried out in the presence or absence of an organic diluent.

Now we have found that vat dyestuffs, especially those vat dyestuffs that can only be esterified with difficulty, can be converted into leuco sulfuric acid esters soluble in water by reducing the vat dyestuff with a metal and an anhydrous acid or an inorganic or organic salt in the presence of an organic carboxylic acid amide corresponding to the general formula

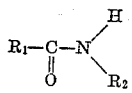

where $R_1$ represents an alkyl group and $R_2$ an alkyl or aryl group, if desired, in the presence of an organic diluent, and then reacting the leuco compound so obtained with a sulfatizing agent.

As monoalkyl or monoaryl carboxylic acid amides of the constitution indicated above there may be used the pure compounds and the technical anhydrous products, such as N-methylacetamide, N-methylpropionamide, N-butylacetamide, N-phenylacetamide or N-tolylacetamide.

The process is suitably carried out in such a manner that the vat dyestuff, preferably in finely divided form, is reacted in a monoalkyl or monoaryl carboxylic acid amide of the above constitution or in a mixture of these compounds with a metal, such as zinc dust, iron or copper powder, and an anhydrous acid, such as glacial acetic acid, mono-, di-, or trichloroacetic acid, hydrochloric acid or propionic acid in the presence of an organic diluent. The temperature required for reducing the vat dyestuff depends on the particular properties of the vat dyestuff used and on the selected metal and anhydrous acid and is within the range of about 30° C. and 75° C., preferably between about 40° C. and 70° C. When the reduction is carried out, for instance, with zinc dust and glacial acetic acid, it is of advantage to operate at a temperature between 30° C. and 55° C. Instead of zinc dust there may also be used, for example, Devarda's alloy (alloy from 50% Cu, 45% Al and 5% Zn), and formic acid may be used instead of glacial acetic acid. Instead of the metal and the anhydrous acid there may also be used an inorganic or organic salt soluble in the carboxylic acid amide, such as lithium chloride, lithium sulfate, calcium chloride, magnesium chloride, potassium ethyl sulfate, the sodium salt of the benzenesulfonic acid or naphthalene-1-sulfonic acid.

The resulting compounds of the vat dyestuffs are then converted into their leuco sulfuric acid esters soluble in water by reacting them at a temperature between about 20° C. and 70° C., preferably between about 30° C. and 45° C. with a sulfatizing agent, such as sulfur trioxide or a compound yielding sulfur trioxide. The sulfatization is suitably carried out in such a manner that the leuco compound obtained as described above is reacted with a sulfatizing agent, such as sulfur trioxide or a compound yielding sulfur trioxide, such as chlorosulfonic acid, in the presence of an organic carboxylic acid amide of the constitution indicated above. The reaction can be carried out in the presence or absence of a diluent, such as acetone, methylene chloride, chlorobenzene, ethylene chloride or benzene.

The diluents may be added to the reduction mixture as well as to the sulfatizing agent. In order to obtain the optimum yield of leuco sulfuric acid salt, the mixing proportion of the carboxylic acid amides and the organic diluent is to be adjusted to the specific character of the vat dyestuff.

Moreover, the corresponding leuco sulfuric acid esters can also be prepared easily and in a good yield from vat dyestuffs which can only be esterified with difficulty. As vat dyestuffs of this kind there come into consideration compounds which on the usual esterification in pyridine in the presence of a reducing agent form a product other than the normal leuco compounds. Vat dyestuffs which can only be esterified with difficulty also include those dyestuffs the normal leuco compounds of which have a strong tendency to be converted into the corresponding keto- or oxanthrone form (cf. Melliand Textilberichte 28, pages 93, 136 and 273 (1948)), such as anthrimides, anthrimide-carbazoles, for example 1,1′,5,1″-trianthrimide-2,2′,6,2″-carbazole or 4,5′-dibenzoylamino-1,1′-dianthrimide-2,2″-carbazole, various acylaminoanthraquinones, such as 1,4-dibenzoylaminoanthraquinone or 1,5-dibenzoylamino-4,8-dihydroxyanthraquinone.

The dyeings and prints produced according to the usual methods with the leuco sulfuric acid esters obtainable by the present invention are distinguished especially by the brightness of the tint and very good fastness properties.

The following examples serve to illustrate the invention but they are not intended to limit it thereto, the parts being by weight.

*Example 1*

14 parts of zinc dust are introduced into a mixture of 20 parts of dimethoxydibenzanthrone, 100 parts of 1,2-dichlorethane and 50 parts of N-methylacetamide. 16 parts of glacial acetic acid are then added to this mixture and the whole is stirred for 6 hours at 40° C. in a nitrogen atmosphere. The red, highly fluid mixture is then introduced into a sulfatizing mixture of 70 parts of N-methyl-acetamide, 70 parts of 1,2-dichlorethane and 50 parts of sulfur trioxide and the whole is stirred for 1 hour at 40° C. When the esterification is complete, the reaction mixture is poured into one liter of a sodium carbonate solution of 15% strength, the 1,2-dichlorethane is distilled off under reduced pressure, the insoluble ingredients are separated by filtration and the leuco sulfuric acid ester is salted out with potassium chloride. It is filtered off with suction, stabilized with 1 part of sodium carbonate, 1 part of urea and 1.7 parts of molasses, and dried at 40° C. to 50° C. under reduced pressure.

Instead of the anhydrous acetic acid there may also be used 19.5 parts of chloroacetic acid.

Example 2

A mixture of 20 parts of pulverized 2,9-dibromo-dibenzpyrene quinone, 100 parts of ethylene chloride, 50 parts of N-methylacetamide, 14 parts of zinc dust and 16 parts of glacial acetic acid is stirred for 6 hours at 40° C. in a nitrogen atmosphere. The mixture is then poured into a sulfatizing mixture of 70 parts of ethylene chloride, 70 parts of N-methylacetamide and 50 parts of sulfur trioxide. The whole is stirred for one hour at 40° C. and then introduced into a sodium carbonate solution of 15% strength. The leuco sulfuric acid ester is then worked up and isolated as described in Example 1.

Example 3

20 parts of pulverized 1,1'-dianthrimide-2,2'-carbazole are stirred for 6 hours at 40° C. in a nitrogen atmosphere with 70 parts of N-methylacetamide, 70 parts of ethylene chloride, 14 parts of zinc dust and 16 parts of glacial acetic acid. The whole is then cooled to 30° C., introduced into a sulfatizing mixture of 100 parts of ethylene chloride, 50 parts of N-methylacetamide and 50 parts of sulfur trioxide, stirred for 1 hour at 40° C. and the reaction mixture is entered into a sodium carbonate solution of 15% strength. The product is worked up as described in Example 1.

Example 4

20 parts of 4,5'-dibenzoylamino-1,1'-dianthrimide-2,2'-carbazole are reduced in a mixture of 90 parts of N-ethylacetamide and 50 parts of 1,2-dichlorethane with 14 parts of zinc dust and 2 parts of lithium chloride in a nitrogen atmosphere. The temperature amounts to 70° C. The reduction mixture is then cooled to 30° C. and esterified by introducing the same into a sulfatizing mixture of 100 parts of 1,2-dichlorethane, 50 parts of N-ethylacetamide and 50 parts of sulfur trioxide. The whole is stirred for one hour at 40° C., the reaction mixture is poured into a sodium carbonate solution of 15% strength, the 1,2-dichlorethane is distilled off under reduced pressure, and the insoluble ingredients are separated by filtration. The leuco sulfuric acid ester is salted out with potassium chloride, washed with saturated potassium chloride solution and then further treated as described in Example 1.

Example 5

10 parts of 4,5-dibenzoylamino-1,1'-dianthrimide-2,2'-carbazole, 70 parts of N-methylacetamide, 7 parts of zinc dust and 1 part of lithium chloride are heated for 6 hours at 70° C. in a nitrogen atmosphere. The whole is then cooled to 25° C. and into this reduction mixture is introduced a sulfatizing mixture of 30 parts of N-methylacetamide, 25 parts of sulfur trioxide and 35 parts of ethylene chloride. The whole is stirred for one hour at 40° C. The product is worked up as described in Example 1.

Example 6

A mixture of 20 parts of dimethoxydibenzanthrone, 60 parts of N-methylpropionamide, 100 parts of ethylene chloride, 14 parts of zinc dust and 16 parts of glacial acetic acid is stirred for 6 hours at 40° C. in a nitrogen atmosphere. After cooling to 25° C., the highly fluid mixture is introduced into a sulfatizing mixture of 70 parts of N-methylpropionamide, 70 parts of ethylene chloride and 50 parts of sulfur trioxide. The whole is stirred for 1 hour at 40° C. and then entered into a sodium carbonate solution of 15% strength. After distilling off the ethylene chloride under reduced pressure, filtration and salting out, the leuco sulfuric acid ester is stabilized as described in Example 1.

Example 7

20 parts of 1,1'-dianthrimide-2,2'-carbazole are reduced for 6 hours at 70° C. in a nitrogen atmosphere in a mixture of 70 parts of N-methylacetamide and 70 parts of 1,2-dichlorethane with 14 parts of zinc dust and 16 parts of glacial acetic acid. After cooling to 30° C., the mixture is introduced into a sulfatizing mixture of 100 parts of 1,2-dichlorethane, 50 parts of N-methylacetamide and 50 parts of sulfur trioxide. The mixture is stirred for one hour at 40° C., entered into a sodium carbonate solution of 15% strength and worked up as described in Example 1.

Example 8

A mixture of 20 parts of 4,5,4',5'-dibenzthioindigo, 70 parts of N-methylacetamide, 70 parts of ethylene chloride, 14 parts of zinc dust and 16 parts of glacial acetic acid is stirred for 7½ hours at 70° C. in a nitrogen atmosphere, then cooled to 30° C., introduced into a mixture of 100 parts of ethylene chloride, 50 parts of N-methylacetamide and 50 parts of sulfur trioxide and the temperature is kept at 40° C. for 1 hour, while stirring. The whole is then poured into a sodium carbonate solution of 15% strength, the ethylene chloride is distilled off under reduced pressure, and insoluble ingredients are separated by filtration. After salting out with potassium chloride, the separated leuco sulfuric acid ester is stabilized as described in Example 1.

Example 9

20 parts of 2,9-dibromodibenzpyrenequinone are reduced for 6 hours at 60° C. in a nitrogen atmosphere with 14 parts of zinc dust and 16 parts of formic acid in 100 parts of N-methylacetamide. After cooling to 30° C., the mixture is introduced into a sulfatizing mixture of 70 parts of N-methylacetamide, 70 parts of ethylene chloride and 50 parts of stabilized sulfur trioxide and stirred for one hour at 40° C. The whole is then worked up as described in the foregoing examples.

Example 10

20 parts of 4,5'-dibenzoylamino-1,-1'-dianthrimide-2,2'-carbazole are reduced in 100 parts of N-methylacetamide with 12 parts of zinc dust and 2 parts of potassium ethyl sulfate by stirring for 6 hours at 70° C. in a nitrogen atmosphere. The reduction mixture is then cooled to 30° C. and sulfatized with a mixture of 60 parts of N-methylacetamide, 70 parts of ethylene chloride and 50 parts of sulfur trioxide. The whole is then poured into a sodium carbonate solution of 15% strength, the ethylene chloride is distilled off under reduced pressure, the residue is removed by filtration and after-washed with hot water at 60° C. The leuco sulfuric acid ester is salted out with potassium chloride, washed with saturated potassium chloride solution, filtered off and stabilized with sodium carbonate, urea and molasses.

Example 11

A mixture of 10 parts of 4,5'-dibenzoylamino-1,1'-dianthrimide-2,2'-carbazole and 50 parts of N-methylacetamide is reduced for 6 hours at 40° C. in a nitrogen atmosphere with 6 parts of zinc dust and 1 part of the sodium salt of naphthalene-1-sulfonic acid. After cooling to 25° C., the mixture is introduced into a sulfatizing mixture of 30 parts of N-methylacetamide, 35 parts of ethylene chloride and 25 parts of stabilized sulfur trioxide. The whole is stirred for 1 hour at 40° C., poured into a sodium carbonate solution of 15% strength and then worked up as described in the foregoing examples.

Example 12

8 parts of anhydrous acetic acid and 7 parts of zinc dust are introduced into a mixture of 10 parts of 1,1',5,1''-trianthrimide-2,2',6,2''-carbazole, 50 parts of ethylene chloride and 20 parts of N-methylacetamide. The reaction mixture is stirred for 6 hours at 40° C. in a nitrogen atmosphere until the color has turned to yellow-green. The reducing mixture having a temperature of 30°C. is introduced, while cooling, into a mixture prepared at 20° C. from 30 parts of N-methylacetamide, 35 parts of ethylene chloride and 22 parts of sulfur trioxide. The addition and cooling are adjusted in such a manner that the reaction temperature is from 35°C. to 40°C. The mixture is stirred for 30 minutes at 40°C., introduced into a sodium carbonate solution of 15% strength in excess and distilled under reduced pressure. The zinc residue is separated by filtration and the leuco sulfuric acid ester is salted out in the form of a yellow precipitate by adding potassium chloride.

Example 13

20 parts of a dyestuff obtainable by condensing 1,4,5,8-tetrachloranthraquinone with 1-aminoanthraquinone and carbazole ring closure are introduced into a mixture of 110 parts of ethylene chloride, 40 parts of N-methylacetamide, 16 parts of glacial acetic acid and 14 parts of zinc dust and the whole is stirred for 6 hours at 45°C. When the reduction is complete, the mixture is cooled to 30°C. and introduced into a sulfatizing mixture of 80 parts of N-methylacetamide, 70 parts of ethylene chloride and 46 parts of sulfur trioxide. The whole is esterified for 30 minutes at 40° C., entered into a sodium carbonate solution of 15% strength in excess and distilled at 30°C. under reduced pressure. After separation of the residue, the leuco sulfuric acid ester is salted out from the solution.

We claim:

1. In the process for preparing the leuco form of vat dyestuffs selected from the group consisting of lower aryl and lower alkyl acylamino anthraquinones, unsubstituted anthrimide carbazoles, lower aryl and lower alkyl acylamino-substituted anthrimide carbazoles, halogen substituted anthrimide carbazoles, lower alkoxy-substituted dibenzanthrones, halogen-substituted dibenzpyrenequinones, and lower aryl substituted indigo dyes, the reducing step which comprises contacting the finely dispersed dyestuff at a temperature in the range from about 30° C. to 75°C. with a finely divided metal of the group consisting of zinc, iron, and copper and combinations thereof with a member selected from the group consisting of formic acid, acetic acid, propionic acid, monochloroacetic acid, dichloroacetic acid, trichloroacetic acid, hydogen chloride, lithium chloride, lithium sulfate, calcium chloride, magnesium chloride, potassium ethyl sulfate, sodium salt of the benzene sulfonic acid and the sodium salt of naphthalene-1-sulfonic acid, and with an organic carboxylic acid amide of the formula

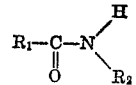

wherein $R_1$ represents a lower alkyl group and $R_2$ represents a member selected from the group consisting of lower alkyl groups, phenyl and tolyl groups.

2. A process as claimed in claim 1, wherein the reduction of the dyestuff is carried out in the presence of a diluent of the group consisting of ethylene chloride, methylene chloride, acetone, benzene and chlorobenzene.

3. A process as claimed in claim 1, wherein the vat dyestuff is reduced at a temperature of about 40–70°C. and the leuco compound so obtained is reacted at a temperature of about 30–45°C.

4. A process as claimed in claim 1, wherein a member selected from the group consisting of N-methylacetamide, N-methylpropionamide, N-butylacetamide, N-phenylacetamide and N-tolylacetamide is used as organic carboxylic acid amide.

5. In a process for preparing the leuco form of 4,5′-dibenzoylamino-1,1′-dianthrimide-2,2′-carbazole, the step which comprises reducing said vat dyestuff with a mixture of N-ethylacetamide, 1,2-dichloroethane, zinc dust and lithium chloride at a temperature of about 35–70°C.

6. In a process for preparing the leuco form of 1,1′,5,1″-trianthrimide-2,2′,6,2″-carbazole, the step which comprises reacting said vat dyestuff with a mixture of ethylene chloride, N-methylacetamide, zinc dust and anhydrous acetic acid at a temperature of about 35–55° C.

7. In a process for preparing the leuco form of the dyestuff obtainable by condensing 1,4,5,8-tetrachloroanthraquinone with 1-amino-anthraquinone and subsequent ring closure, the step which comprises reacting said dyestuff at a temperature of about 40–65°C. with a mixture of ethylene chloride, N-methylacetamide, anhydrous acetic acid and zinc dust.

References Cited in the file of this patent

UNITED STATES PATENTS

| | | |
|---|---|---|
| 2,660,580 | Von | Nov. 24, 1953 |
| 2,685,582 | Coffey et al. | Aug. 3, 1954 |

FOREIGN PATENTS

| | | |
|---|---|---|
| 496,326 | Canada | Sept. 22, 1953 |